(12) United States Patent
Briggs et al.

(10) Patent No.: US 10,545,806 B2
(45) Date of Patent: Jan. 28, 2020

(54) PROXIMITY CORRECTION IN THREE-DIMENSIONAL MANUFACTURING

(71) Applicant: INTERNATIONAL BUSINESS MACHINES CORPORATION, Armonk, NY (US)

(72) Inventors: Benjamin D. Briggs, Waterford, NY (US); Lawrence A. Clevenger, LaGrangeville, NY (US); Leigh Anne H. Clevenger, Rhinebeck, NY (US); Christopher J. Penny, Saratoga Springs, NY (US); Michael Rizzolo, Albany, NY (US); Aldis G. Sipolins, New York City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 15/614,066

(22) Filed: Jun. 5, 2017

(65) Prior Publication Data

US 2018/0349220 A1 Dec. 6, 2018

(51) Int. Cl.
*G06F 19/00* (2018.01)
*G06F 11/07* (2006.01)
*G06T 19/20* (2011.01)
*H04N 1/00* (2006.01)

(52) U.S. Cl.
CPC ...... *G06F 11/0733* (2013.01); *G06F 11/0736* (2013.01); *G06T 19/20* (2013.01); *H04N 1/00068* (2013.01)

(58) Field of Classification Search
CPC .. G06F 11/0733; G06F 11/0736; G06T 19/20; H04N 1/00068
See application file for complete search history.

(56) References Cited

U.S. PATENT DOCUMENTS

| 5,506,607 | A | * | 4/1996 | Sanders, Jr. | ............... B41J 2/01 118/695 |
| 5,866,058 | A | | 2/1999 | Batchelder et al. | |
| 6,405,095 | B1 | | 6/2002 | Jang et al. | |
| 8,719,736 | B1 | | 5/2014 | Zhang et al. | |
| 2006/0061613 | A1 | * | 3/2006 | Fienup | ................. B41J 2/16532 347/19 |
| 2008/0124475 | A1 | * | 5/2008 | Kritchman | .............. B29C 41/48 427/421.1 |

(Continued)

OTHER PUBLICATIONS

Wang et al., Thermal Expansion Coefficient, 2011, Polymer Matrix composite Technology, (Year: 2011).*

(Continued)

*Primary Examiner* — Kidest Bahta
(74) *Attorney, Agent, or Firm* — Tuntunjian & Bitetto, P.C.; Vazken Alexanian (57) ABSTRACT

Methods and systems for printing accurate three-dimensional structures include printing a three-dimensional structure according to an original three-dimensional model. The original three-dimensional model is adjusted to reduce measured differences between the printed three-dimensional structure and the original three-dimensional model. A three-dimensional structure is printed according to the adjusted three-dimensional model.

16 Claims, 5 Drawing Sheets

(56) References Cited

U.S. PATENT DOCUMENTS

| | | | |
|---|---|---|---|
| 2010/0162199 A1* | 6/2010 | Liu | G03F 1/144 |
| | | | 716/54 |
| 2012/0053716 A1* | 3/2012 | Bickel | G06F 17/50 |
| | | | 700/98 |
| 2013/0328228 A1* | 12/2013 | Pettis | F16M 11/12 |
| | | | 264/40.1 |
| 2015/0097777 A1 | 4/2015 | Brown et al. | |
| 2015/0201500 A1* | 7/2015 | Shinar | H05K 3/125 |
| | | | 425/132 |
| 2015/0224290 A1* | 8/2015 | Chanduszko | A61F 2/958 |
| | | | 600/585 |
| 2015/0343673 A1 | 12/2015 | Williams | |
| 2016/0339646 A1 | 11/2016 | Baecker et al. | |
| 2017/0292922 A1* | 10/2017 | Woods | G01N 23/046 |

OTHER PUBLICATIONS

Martin Lamonica, Additive Manufacturing GE, the world's largest manufacturer, is on the verge of using 3-D printing to make jet parts, https://www.technologyreview.com/s/513716/additive-manufacturing, retrieved Mar. 21, 2017, p. 1-6.

Peng Liu et al., A full-chip 3D computational lithography framework, Optical Microlithography XXV, Feb. 12, 2012.

T. Mukherjee et al., Mitigation of thermal distortion during additive manufacturing, Scripta Materialia, Jan. 2017.

R. Vaidyanathan et al., Rapid Prototyping of Continuous Fiber Reinforced Ceramic Matrix Composites, Advanced Ceramics Research, Inc.; Tucson, AZ, Jan. 1, 2003.

\* cited by examiner

PROXIMITY CORRECTION IN THREE-DIMENSIONAL MANUFACTURING

BACKGROUND

Technical Field

The present invention generally relates to three-dimensional manufacturing and, more particularly, to proximity correction in materials that change dimensions under temperature changes.

Description of the Related Art

Three-dimensional (3D) printing involves the creation of 3D objects using, e.g., mechanical processes to extrude or otherwise form material according to a design. In this manner, such objects can be rapidly formed to order. Exemplary 3D processes include plastic extrusion and laser sintering.

However, while 3D printing provides significant benefits in rapid prototyping and inexpensive hardware testing, current 3D printing processes introduce dimensional and positional errors during manufacturing due to mismatches in coefficients of thermal expansion (CTE) during deposition. Manually inspecting and modifying parts after each build is difficult, time consuming, and expensive. Furthermore, manual sanding, milling, or polishing of parts can produce inconsistent results.

SUMMARY

A method for printing accurate three-dimensional structures includes printing a three-dimensional structure according to an original three-dimensional model. The original three-dimensional model is adjusted to reduce measured differences between the printed three-dimensional structure and the original three-dimensional model. A three-dimensional structure is printed according to the adjusted three-dimensional model.

A method for printing accurate three-dimensional structures includes printing a three-dimensional structure according to an original three-dimensional model. Dimensions of the printed three-dimensional structure are measured. Differences between the measured dimensions of the three-dimensional structure and the original three-dimensional model are measured. The original three-dimensional model is adjusted to reduce measured differences between the printed three-dimensional structure and the original three-dimensional model. A three-dimensional structure is printed according to the adjusted three-dimensional model. The measurement, determination of differences, adjustment of the original three-dimensional model, and printing of the three-dimensional structure according to the adjusted three-dimensional module are repeated until the determined differences fall within tolerances.

A system for printing accurate three-dimensional structures includes a three-dimensional printer configured to print a three-dimensional structure according to an original three-dimensional model. A three-dimensional scanner is configured to measure differences between the printed three-dimensional structure and the original three-dimensional model. A model adjustment system includes an adjusting module configured to adjust the original three-dimensional model to reduce measured differences between the printed three-dimensional structure and the original three-dimensional model and to provide the adjusted three-dimensional model to the three-dimensional printer.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide automatic proximity correction to modify dimensional information in a three-dimensional (3D) printing model. Iterative builds, measurements, and modifications are used to adjust the 3D model such that the printed output closely conforms to the intended structure. The term proximity correction refers to the correction of errors that result from nearby edges of patterns interfering with one another, with structures being printed where they should not be.

To accomplish this, a structure is 3D printed according to a 3D model. A 3D scanner is then used to determine the actual dimensions of the output structure after, for example, the structure cools to room temperature. The dimensional changes that occurred due to the thermal expansion or contraction are determined and the 3D model is automatically adjusted to accommodate those thermal changes. A new structure is then printed based on the adjusted 3D model and the process is repeated until the printed structure closely conforms to the original 3D model.

Thermal expansion and contraction occurs in all materials as a result of temperature changes. While some materials exhibit negative thermal expansion in certain thermodynamic regions, for the most part solid materials expand when heated and contract when cooled. The relationship between a material's change in size under a given change in temperature is governed by the material's coefficient of thermal expansion (CTE). The CTE measures the fractional change in material volume per degree change in temperature at a constant pressure. In general, the volumetric thermal expansion coefficient at a constant pressure can be expressed as:

$$\alpha_V = \frac{1}{V}\left(\frac{\partial V}{\partial T}\right)_p$$

where V is the volume of an object and T is the temperature and where the subscript p indicates that the change in volume per change in temperature is measured at a constant pressure, per standard thermodynamic notation.

The effects of thermal expansion and contraction are particularly pronounced at the edges of a bulk object. For example, sharp corners will tend to round-out under thermal contraction. In some cases, narrow structures may thin-out and even break, potentially causing structural and/or electrical deficiencies in the output structure.

Figure 1:
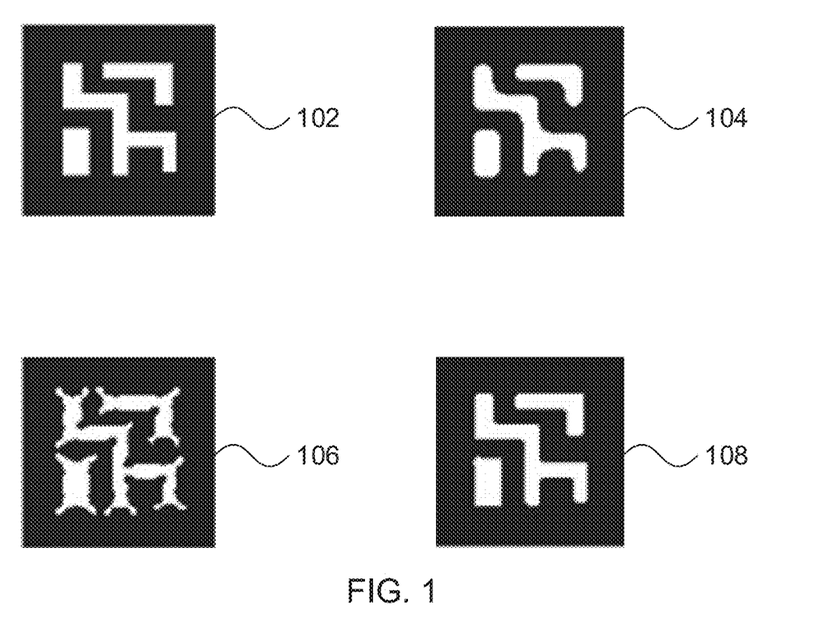
FIG. 1 is a diagram showing an example of two-dimensional automatic proximity correction.

Referring now to the drawings in which like numerals represent the same or similar elements and initially to FIG. 1, an example is shown of original mask images and output structures in a two-dimensional case where errors are introduced by optical scattering. It should be understood that two-dimensional diagrams are used solely for ease of illustration of the principles being described and should not be construed as limiting. Similar errors are introduced in 3D printing due to thermal effects.

A first mask image 102 shows a structure to be printed. The first mask image 102 represents the structure as it should be formed in its final output. The first output image 104 shows how processing errors cause the output structure to diverge from the first mask image 102.

After measuring the actual dimensions produced in the first output image 104, the present embodiments generate an adjusted second mask image 106. The adjusted second mask image 106 includes features that account for the processing errors, for example by adding additional material in regions that will contract or removing material from regions with a large bulk of material. A second output 108 shows the output that results from the adjusted second mask image 106, with much sharper features. The second output 108 is significantly closer to the design of the first mask image 102 than is the first output 104.

Figure 6:
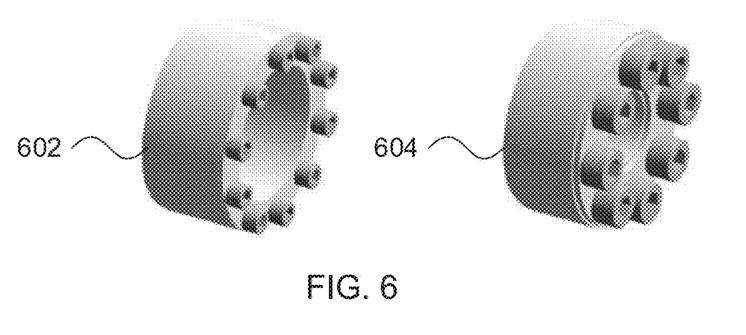
FIG. 6 is a diagram showing an example of thermal expansion in a three-dimensional printed object in accordance with an embodiment of the present invention.

Referring now to FIG. 6, an example of the effects of thermal expansion in three dimensions is shown. The model of the device to be printed 602 is shown on the left, while the printed device 604 is shown on the right. The printed device 604 shows generally expanded features, with an increased outer diameter and decreased inner diameter resulting from the overall increase of volume of the material.

Figure 2:
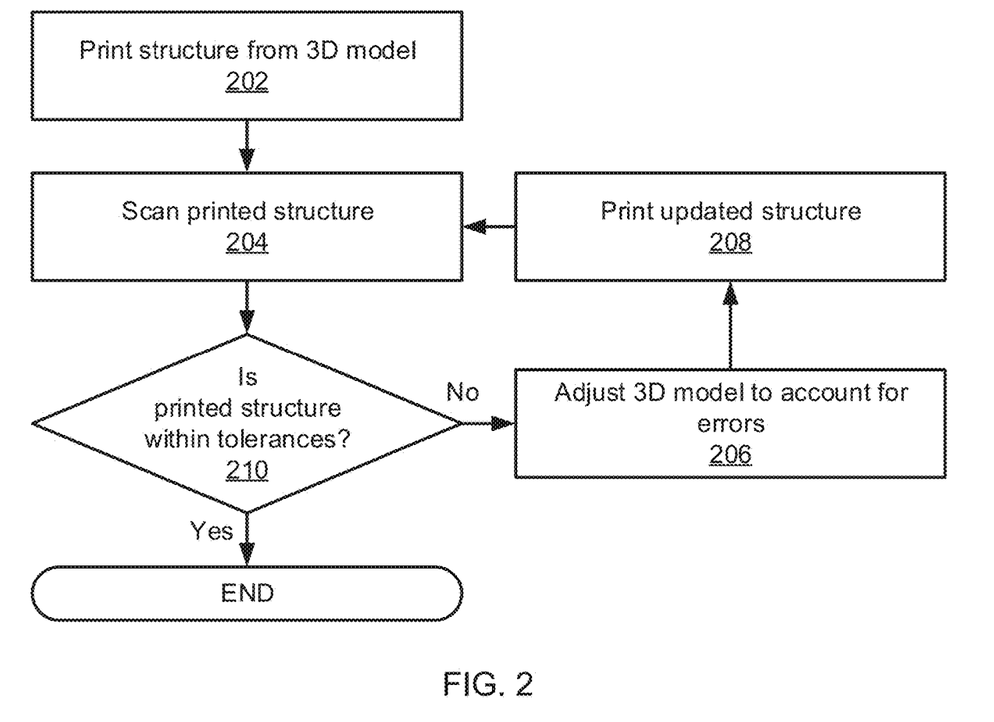
FIG. 2 is a block/flow diagram of a method of three-dimensional automatic proximity correction in accordance with an embodiment of the present invention.

Referring now to FIG. 2, a method of automatically performing proximity correction for 3D-printed structures is shown. Block 202 prints a 3D structure from a 3D model. The 3D printing process can include any appropriate mechanism for 3D printing a device including, e.g., plastic extrusion, electron beam melting, laser sintering, stereolithography, etc. The structure produced by the 3D printing process may deviate from the 3D printed model due to, for example, thermal effects or fabrication errors.

Block 204 then scans the printed structure. This scan may be performed using a 3D scanner that automatically creates a 3D model of the printed structure and includes information regarding the exact physical location of the printed features, roughness, and any other similar qualities describing the actual product of the 3D printing process. The 3D scanner thereby builds a full 3D description of the structure as it was actually printed.

Block 210 determines whether the scanned 3D model is within tolerances of the original 3D model. In one exemplary embodiment, block 206 may apply a series of constrains to differences between the original 3D model and the scanned 3D model. The constraints may include, for example, a maximum dimensional difference, a maximum volumetric difference, a per-unit-volume metric that determines whether individual pieces differ too greatly from the original, etc. These constraints correspond to engineering tolerances that dictate whether the printed structure is acceptable. For example, if a given piece of the structure needs to have a tight tolerance, then the dimensions of that piece will be weighted heavily in the determination of block 210. The determination can be made on a few high-priority constraints or on an overall weighted average that is automatically calculated.

If the printed structure is not within tolerances, block 206 adjusts a working 3D model based on the original 3D model to account for the errors. This adjustment may include the addition of subtraction of material from regions of the 3D model in a manner that is calculated to bring the printed structure into closer conformity with the original 3D model. For example, the intended volume of a small region of the original 3D model may be denoted as $V_I$, the actual volume of a corresponding small region of the printed structure may be denoted as $V_P$, and a difference in volume of the printed structure from the original 3D model is denoted as $\Delta V$. The relationship between these quantities is $V_P = V_I + \Delta V$. Another expression for the difference between the intended volume and the printed volume is $\Delta V = \alpha_V V_I \Delta T$. It can then be determined that the volume of a corresponding small region of an updated 3D model, $V_U$, may be determined as $V_U = V_I - \Delta V$. The entire 3D model can be updated in a piecewise fashion in a piecewise fashion, with each small region being independently adjusted and then moved to account for the shrinking and expansion of neighboring regions.

Once the adjusted 3D model has been generated, block 208 prints an updated structure based on the adjusted 3D model. Block 204 then scans the newly printed structure and block 210 determines whether the updated structure is within tolerances based on the constraints discussed above. This procedure repeats until the adjusted 3D model produces a structure that is within tolerances or, e.g., a maximum number of iterations has been reached. At this point, a manual finishing step may optionally be performed to, e.g., mill or polish the final printed structure to more precise dimensional tolerances. Even when such a manual finishing step is performed, the automatic proximity correction saves significant time and wear on the milling equipment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
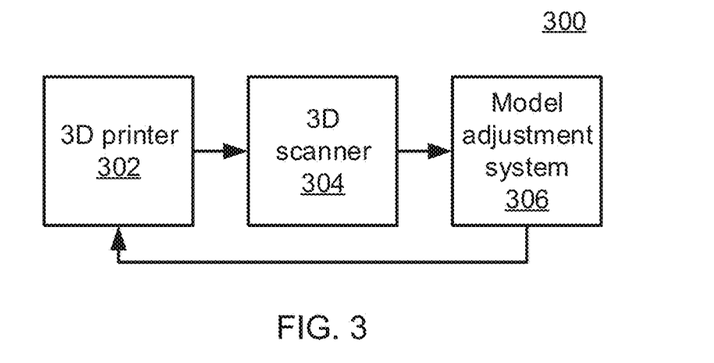
FIG. 3 is a block diagram of a three-dimensional automatic proximity correction system in accordance with an embodiment of the present invention.

Referring now to FIG. 3, a proximity correction system 300 is shown. A 3D printer 302 prints structures in accordance with input 3D models, including an original 3D model. The 3D printer 302 may operate according to any appropriate 3D printing process including, but not limited to, plastic extrusion, electron beam melting, laser sintering, stereolithography, etc.

A 3D scanner 304 takes the structures created by the 3D printer and scans them in three dimensions to create a printed 3D model that reflects the structure as it was actually formed, after any thermal expansion or contraction has taken place. Examples of 3D scanners include, but are not limited to, contact-based scanners, structured light scanners, modulated light scanners, passive optical scanners, and laser scanners. Types of laser scanner include, but are not limited to, time-of-flight scanners, triangulation scanners, and conoscopic holographic scanners. A model adjustment system 306 then compares the printed 3D model to the original 3D model and determines corrections to the original 3D model, thereby providing an adjusted 3D model which is provided to the 3D printer 302. As shown, this process is iteratively repeated until the model adjustment system 306 determines that the printed 3D model is within tolerances as compared to the original 3D model.

Figure 4:
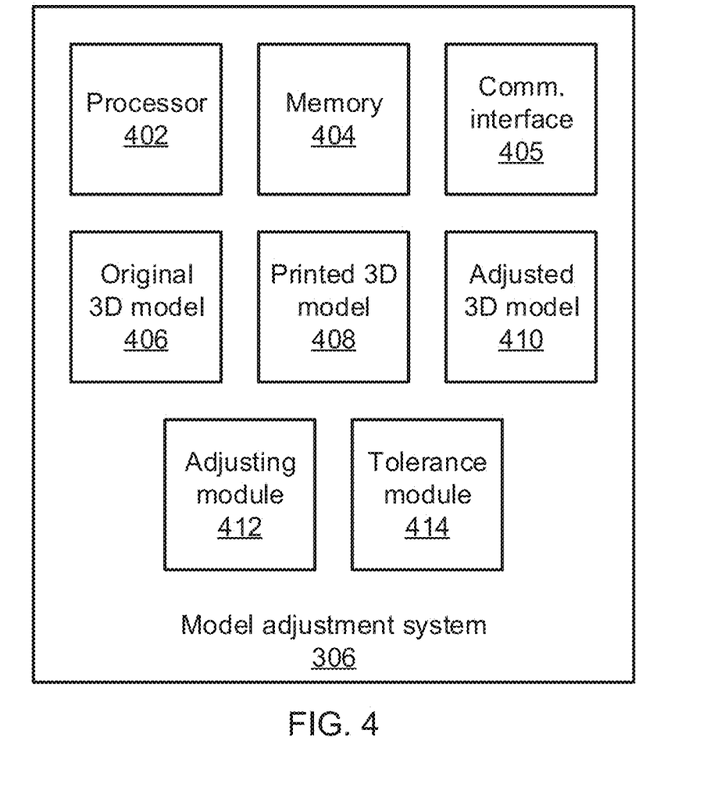
FIG. 4 is a block diagram of a three-dimensional model adjustment system in accordance with an embodiment of the present invention.

Referring now to FIG. 4, additional detail on the model adjustment system 306 is shown. The model adjustment system 306 includes a hardware processor 402 and a memory 404. A communications interface 405 provides wired or wireless communications to the 3D printer 302 and the 3D scanner 304. In particular, the communications interface 405 receives the output of the 3D scanner 304 in the form of printed 3D model 408 and stores the printed 3D model 408 in memory. After the model adjustment system 306 makes appropriate adjustments, the communications interface 405 sends the adjusted 3D model 410 to the 3D printer 302. In alternative embodiments, the model adjustment system 306 may employ some variety of computer readable medium such as, e.g., an optical or magnetic disc, to transfer files to and from other systems.

The model adjustment system 306 further includes one or more functional modules that may, in some embodiments, be implemented as software that is stored in memory 404 and executed by processor 402. In other embodiments the functional module(s) may be implemented as one or more dedicated hardware components in the form of, e.g., application specific integrated chips or field programmable gate arrays. For example, adjusting module 412 compares the printed 3D model 408 to an original 3D model 406 that is stored in memory 404. The adjusting module 412 then determines changes to make to the original 3D model 406 and creates the adjusted 3D model 410. The adjusted 3D model 410 is subsequently used to print the next iteration of the structure. Tolerance module 414 determines whether a particular printed 3D model 408 satisfies constraints relative to the original 3D model 406 to determine whether further adjustments should be made.

Figure 5:
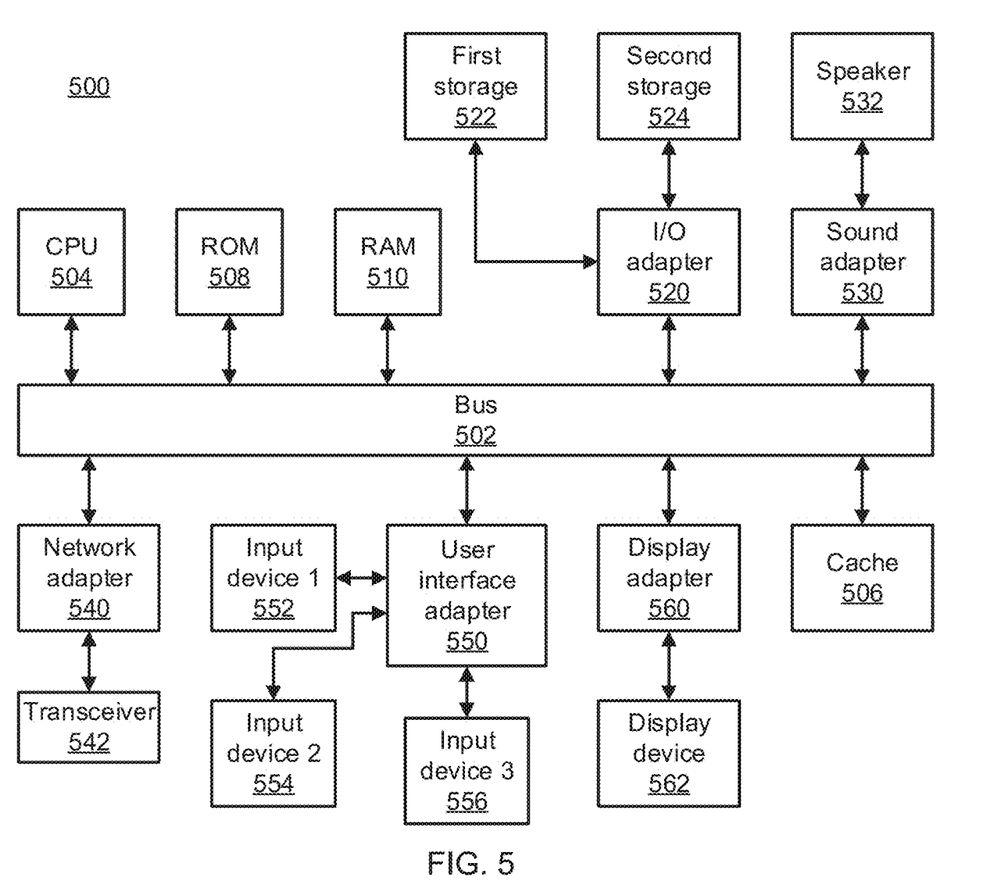
FIG. 5 is a block diagram of a processing system in accordance with an embodiment of the present invention.

Referring now to FIG. 5, an exemplary processing system 500 is shown which may represent the model adjustment system 306. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments of proximity correction in three-dimensional manufacturing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for printing accurate three-dimensional structures, comprising:
   printing an original three-dimensional structure according to an original three-dimensional model;
   adjusting the original three-dimensional model to reduce measured differences between the printed three-dimensional structure and the original three-dimensional model, based on a coefficient of thermal expansion for a material of the structure, by adding material to the original three-dimensional model in proportion to an amount of thermal contraction in a region; and
   printing an adjusted three-dimensional structure according to the adjusted three-dimensional model.

2. The method of claim 1, further comprising measuring dimensions of the printed three-dimensional structure.

3. The method of claim 2, further comprising determining differences between the measured dimensions of the printed three-dimensional structure and the original three-dimensional model.

4. The method of claim 3, further comprising determining that the determined differences fall within tolerances.

5. The method of claim 3, wherein adjusting the original three-dimensional model and printing the three-dimensional structure according to the adjusted three dimensional model are repeated until the determined differences fall within tolerances.

6. The method of claim 2, wherein measuring the dimensions of the printed three-dimensional structure comprises measuring the three-dimensional structure with a three-dimensional scanner.

7. The method of claim 1, wherein adjusting the original three-dimensional model comprises determining a volume change for regions of the original three-dimensional model in a piecewise fashion.

8. A non-transitory computer readable storage medium comprising a computer readable program for printing accurate three-dimensional structures, wherein the computer readable program when executed on a computer causes the computer to perform the steps of:
   printing an original three-dimensional structure according to an original three-dimensional model;
   adjusting the original three-dimensional model to reduce measured differences between the printed three-dimensional structure and the original three-dimensional model, based on a coefficient of thermal expansion for a material of the structure, by adding material to the original three-dimensional model in proportion to an amount of thermal contraction in a region; and
   printing an adjusted three-dimensional structure according to the adjusted three- dimensional model.

9. A system for printing accurate three-dimensional structures, comprising:
   a three-dimensional printer configured to print an original three-dimensional structure according to an original three-dimensional model;
   a three-dimensional scanner configured to measure differences between the printed three-dimensional structure and the original three-dimensional model; and
   a model adjustment system comprises an adjusting module configured to adjust the original three-dimensional model to reduce measured differences between the original three-dimensional structure and the original three-dimensional model, based on a coefficient of thermal expansion for a material of the structure, by adding material to the original three-dimensional model in proportion to an amount of thermal contraction in a region, and to provide the adjusted three-dimensional model to the three-dimensional printer.

10. The system of claim 9, wherein the model adjustment system further comprises a tolerance module configured to determine differences between the measured dimensions of the printed three-dimensional structure and the original three-dimensional model.

11. The system of claim 10, wherein the tolerance module is further configured to determine whether the determined differences fall within tolerances.

12. The system of claim 10, wherein the model adjustment system is further configured to repeat adjustment the original three-dimensional model and triggering of the printing the three-dimensional structure according to the adjusted three-dimensional model are repeated until the determined differences fall within tolerances.

13. The system of claim 9, wherein the adjusting module is further configured to determine a volume change for regions of the original three-dimensional model in a piecewise fashion.

14. The system of claim 9, wherein the three-dimensional scanner is selected from the group consisting of contact-based scanners, structured light scanners, modulated light scanners, passive optical scanners, time-of-flight laser scanners, triangulation laser scanners, and conoscopic holographic laser scanners.

15. The system of claim 9, wherein the three-dimensional printer is selected from a group consisting of plastic extrusion printers, electron beam melting printers, laser sintering printers, and stereolithography printers.

16. The method of claim 1, wherein adjusting further comprises removing material from regions of the original three-dimensional model with a large bulk of material.

* * * * *